INVENTOR.
ROBERT V. BERNIER
BY Wade Koontz
and Charles H. Wagner
ATTORNEYS

Jan. 3, 1956

R. V. BERNIER

SYSTEM AND APPARATUS FOR PROJECTING THREE DIMENSIONAL MOTION PICTURES 2,729,138

Filed July 17, 1951

4 Sheets-Sheet 2

*INVENTOR.*
ROBERT V. BERNIER

*BY* Wade Koontz
Charles H. Wagner
ATTORNEYS

Jan. 3, 1956 R. V. BERNIER 2,729,138
SYSTEM AND APPARATUS FOR PROJECTING THREE
DIMENSIONAL MOTION PICTURES
Filed July 17, 1951 4 Sheets-Sheet 3

INVENTOR.
ROBERT V. BERNIER
BY Wade Koontz
Charles H. Wagner and
ATTORNEYS

INVENTOR.
ROBERT V. BERNIER
BY
Wade Koontz
Charles H. Wagner Jr.
ATTORNEYS 2,729,138

SYSTEM AND APPARATUS FOR PROJECTING THREE DIMENSIONAL MOTION PICTURES

Robert V. Bernier, Dayton, Ohio, assignor, by mesne assignments, to Synthetic Vision Corporation, Dayton, Ohio, a corporation of Ohio Application July 17, 1951, Serial No. 237,275

5 Claims. (Cl. 88—16.6)

(Granted under Title 35, U. S. Code (1952), sec. 266)

The invention described herein may be manufactured and used by or for the Government for governmental purposes without payment to me of any royalty thereon.

This invention relates to the projection of three-dimensional motion pictures.

The invention has as a primary object the provision of a system and apparatus for projecting three-dimensional motion pictures which will be fully comparable in quality with conventional comercial two-dimensional motion pictures from the standpoint of clarity, illumination, contrast, synchronization, registration and freedom from flicker and like defects tending to cause eye strain.

The invention may be readily understood from a brief review of the theories and practice of conventional motion picture projection. In this connection it is a commonly accepted fact that the human eye will retain an image for 1/10 second, and therefore that it will retain continuity of movement of motion pictures taken and projected at the rate of ten frames per second. However, at this rate the eye will detect the flicker which results from shifting alternate frames, since this causes a momentary interval of darkness on the screen, and the eye can detect fluctuations of light and darkness on the screen at frequencies below approximately 40 per second.

In order therefore to assure continuity of vision and movement without flicker, standard projectors are equipped with a shutter mechanism which interrupts the beam both during the instant when the film is advancing and also during the interval of projection at a sufficiently high frequency to give a total of at least 40 fluctuations per second of light and darkness on the screen. For example, in commercial 35 millimeter projectors for theatre use, the normal rate of projection is 24 frames per second and such projectors incorporate a shutter system which interrupts the projected beam once during the projection of each frame and again during the advancing movement of the film to change frames. Thus at a film speed of 24 frames per second, the eye receives a total of 48 images per second from the screen, and this system gives projected two-dimensional motion pictures of the excellent quality available in theatres today. It has also been proposed to increase this projection rate to 30 frames per second, which at the same shutter rate would provide 60 fluctuations or images per second. Similarly in conventional 8 and 16 millimeter projectors, the standard rate of projection is 16 frames per second and the shutter operates to cut off the beam three times per frame, thus again giving a total of 48 images per second, while in 8 and 16 millimeter sound projectors, the projection rate is 24 frames per second and the shutters operate two or three times per frame for a total of 48 or 72 fluctuations per second.

Many attempts have been made to produce three-dimensional motion pictures of a quality comparable to that obtained in two-dimensional projection. For example, highly satisfactory results are obtainable by means of twin projectors utilizing separate films for the right and left eye images respectively, and each provided with a polarizing filter oriented in the opposite direction from the filter in the other projector, the viewers with such a system utilizing polarizing spectacles having their lenses similarly arranged in opposite directions. However, such a system entails difficulty in one respect for the reason that accurate synchronization and registration of the films in the two projectors must be maintained, and this is difficult to achieve in commercial operation, particularly in the event of a film break or like mishap. Also the expense of the twin projectors represents a major increase over the cost of normal equipment for two-dimensional projection, the standard practice being to employ two single projectors so that one may be loaded with a fresh reel while the other is operating in order to provide continuous projection.

Another system proposed in the past has involved the use of a single projector employing motion picture film wherein alternate frames carry the right and left eye stereoscopic images, with the projector being provided with a polarizing device operable to shift the direction of polarization of the respective right and left eye images through 90°. For example, my Patent No. 2,478,891, issued August 16, 1949, illustrates such a system and apparatus in which a barrel-shaped polarizing filter is mounted for rotation in the path of the projected beam on an axis normal to the beam. The polarizing axis of this filter is so arranged that as the filter rotates, it polarizes the beam first in one direction and then at 90° to the first direction, and rotation thereof is synchronized with the movement of the film to give properly opposed directions of polarization of the respective right and left eye images.

The polarizing filter in the system is readily synchronized with the film travel, as by a direct driving connection with the film itself or a part of the film drive system, and thus gives accurately opposed directions of polarization for the two eye images. Also since this filter is continuously rotating, it is effectively self-cooling as well as free of undesirable vibration and shock. On the other hand, since with this system the images for the two eyes are projected alternately, during the interval when the image for one eye is on the screen, and vice versa. Therefore, in a 35 millimeter projector operating at 24 frames per second and equipped with a shutter device as outlined above, each eye in succession will first see two images of the same frame during an interval of 1/24 second, but the screen will then appear dark to that eye for the next 1/24 second while the two images for the other eye are being projected, and since the resulting alternating intervals of light and darkness on the screen fluctuate at a frequency of only 24 per second, they are within the range detectable by the eye and give the effect of flicker.

This result can be prevented by changing the feeding mechanism of the projector in such manner that the images for the two eyes alternate more rapidly. For example, highly satisfactory results have been obtained by means of a projector equipped with a shutter mechanism such that the beam is interrupted at the rate of three times per frame and also equipped with a feeding mechanism for the film incorporating a special shuttle system such that each frame in succession is moved first into the film gate aperture, then back out of the aperture, then again forward into the aperture, then forward beyond the aperture, and then back into the aperture again before being finally advanced beyond the aperture. With such a projector operating at a net film speed of 24 frames per second, the right and and left eye images will alternate on the screen at the rate of 72 per second, and the dark interval for each eye on the screen is therefore only approximately 1/36 second, and this is sufficiently near the rate of 40 fluctuations per second which is not within the power of the eye to detect to give effectively flickerless projection. However, while this result is practically obtainable by means such as the special shuttle system outlined above, incorporation thereof in existing projectors would require substantial reconstruction in addition to the fact that it results in greatly increased wear on the film in use.

The present invention is accordingly directed to the provision of a system and apparatus capable of producing results with three-dimensional film which are at least equal in quality and flicker standards to present day two-dimensional film without requiring a special feeding mechanism or control of the feeding mechanism, and more particularly the present invention is directed to making possible the achievement of such results in commercial projectors of the type now in use in motion picture theatres without requiring material change of the projectors and without affecting their ability to project two-dimensional motion pictures.

In accordance with the invention, there is provided an optical system which employs a projector operating generally in the conventional manner and utilizing alternate frame stereoscopic film as outlined above, but in place of the single film gate aperture normally used for two-dimensional projection, a pair of apertures is used, with these apertures being spaced in the direction of film travel in such relation that successive frames of the film will register simultaneously therewith for simultaneous projection on the screen. Thus each frame is projected successively through each of the two apertures, so that whenever the shutter of the projector is open, there will be both a right eye and a left eye image on the screen. In order to separate the right and left images for proper viewing, the projector incorporates a polarizing device for polarizing in opposite directions the two beams carrying these two images, and the operation of this device is so coordinated with the film feeding mechanism of the projector, that the direction of polarization of each beam is shifted through 90° each time the film advances one frame.

It will accordingly be seen that with this system of the invention as outlined above, the fluctuations of light and dark intervals on the screen are identical for both eyes of the viewer and also are identical with the operation of the same projector utilizing a single film gate aperture for two-dimensional projection. Therefore, the quality of the pictures from the standpoint of synchronization, registration and freedom from flicker will be identical with the quality of the two-dimensional pictures produced with the same projector operating at the same frame and shutter rates. In addition, since with this system the same film transport mechanism and shutter arrangement are employed as for two-dimensional projection, it is possible with a minimum of modification to adapt a two-dimensional projector for use in the three-dimensional projection system of the invention.

It is accordingly a major object of the present invention to provide a system and apparatus for projecting three-dimensional motion pictures which will require only a single projector operating in the standard manner and utilizing motion picture film wherein alternate frames carry the right and left eye stereoscopic images and which will result in three-dimensional motion pictures fully comparable in quality with conventional commercial two-dimensional pictures.

It is also a major object of the invention to provide such a system and apparatus capable of ready incorporation in conventional motion picture projectors, including commercial 35 millimeter motion picture projectors of the type commonly used in motion picture theatres, which will not require change of the existing systems for feeding the film and operating the sound track, and which will not affect the utility of the projector for two-dimensional projection.

Another object of the invention is to provide an optical system and apparatus for the projection of three-dimensional motion pictures as outlined above in which a pair of apertures is used for the simultaneous projection of alternate frames of the film carrying right and left eye stereoscopic images, with the beams projected from these apertures being polarized in opposite directions, and with the directions of polarization of the two beams being reversed as the film advances in order to maintain proper opposite polarization of the two projected images at all times.

A further object of the invention is to provide an optical system and apparatus as outlined above for the projection of three-dimensional motion pictures wherein either linear or circularly polarized light may be used for the projection of the two images of the stereoscopic pairs.

Other objects and advantages of the invention will be apparent from the following description, the accompanying drawings, and the appended claims.

In the drawings—

Figures 1, 2:
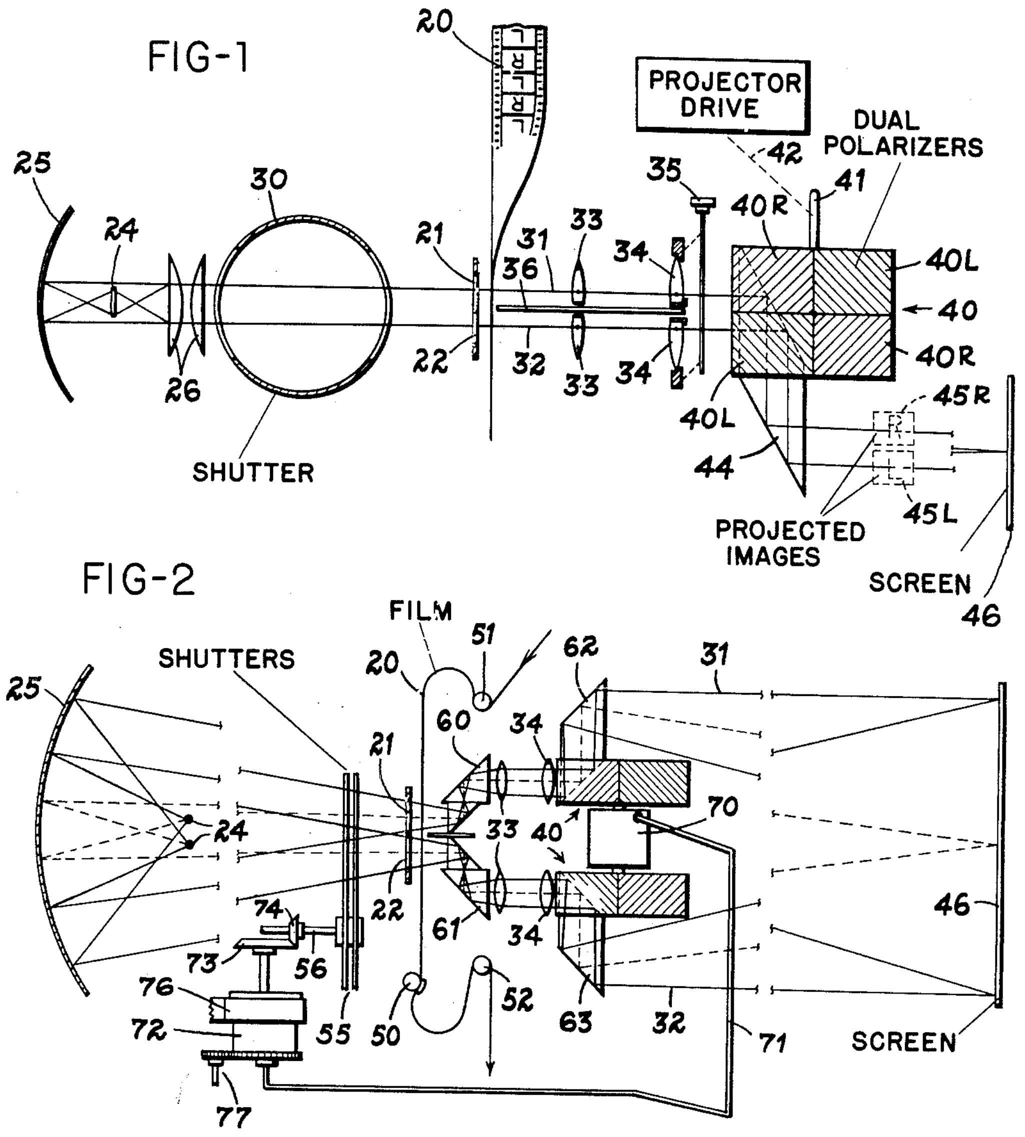
Fig. 1 is a ray diagram illustrating an optical system for the projection of three-dimensional motion pictures in accordance with the invention.
Fig. 2 is a ray diagram illustrating the adaptation of the optical system of Fig. 1 to another type of projector.

Referring to the drawings, which illustrate preferred embodiments of the invention, in the system illustrated in Fig. 1, the film 20 is shown diagrammatically as having right and left eye stereoscopic images in alternate frames, as indicated by the "R" and "L" designations, and these images may be taken alternately in the initial preparation of the film or may be taken simultaneously and then printed alternately on the film. The projector is provided with a pair of film gate apertures 21 and 22 arranged in spaced relation in the direction of film travel in the usual way, and these apertures are of such size and in such spaced relation that they will register simultaneously with successive frames of the film.

The lighting system of Fig. 1 is shown as generally of the character provided in the Ampro 16 millimeter sound projector referred to in my above noted patent. The beam from the filament source 24 and reflector 25 passes through the condensing lenses 26 to the apertures 21 and 22, and it is controlled by a shutter 30 shown as the barrel-type mounted for rotation on its central axis and having a pair of opposed openings therethrough. The main light beam is arranged to pass through both apertures 21 and 22 to provide a pair of beams 31 and 32, and a separate pair of projecting lenses 33 and 34 is provided for each of these beams, with the lenses 34 being mounted for adjustment towards and away from each other by means such as a threaded control rod 35. The lenses are cut away on their adjacent edges to facilitate centering with their respective apertures, and it may also be desirable to include a septum or baffle 36 as shown to maintain separation between the beams 31 and 32.

Figure 3:
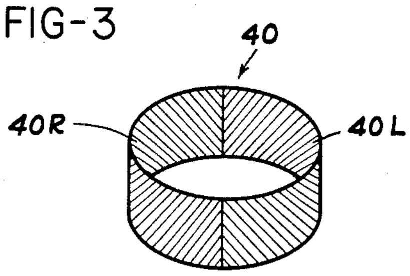
Fig. 3 is a detail view in perspective illustrating one of the polarizing devices employed in the projection system of Figs. 1 and 2.

In order to provide for optical separation of the two images of the stereoscopic pair projected onto the screen, the beams 31 and 32 are polarized in opposite directions by means of a pair of polarizing devices 40 shown as of the barrel-shaped construction disclosed in my above noted patent, and shown in detail in Fig. 3. Each of these devices includes two semi-cylindrical strips 40R and 40L of sheet polarizing material having their polarizing axes at 45° to the length thereof and with the axes of the two strips relatively at right angles, all as indicated by the diagonal lines in the drawings. The polarizers 40 are mounted for rotation in the path of beams 31 and 32 on a common axis 41 normal to the beams, and they are 180° out of phase with each other so that when the strip 40R in one polarizer is presented to its associated beam, the portion 40L of the other polarizer will be presented to the other beam. The polarizers 40 may be driven in any suitable way from the drive of the projector, as indicated diagrammatically at 42, to maintain them in proper synchronization with the advancing film so that each projected right eye image will be polarized in the proper direction and vice versa for each projected left eye image.

After the beams 31 and 32 have passed through the polarizing strips 40R and 40L, they are reflected out of the polarizers as by means of a parallel beam displacer 44 arranged as shown to reflect both beams first generally axially of the polarizers and then again forwardly to carry the polarized images indicated diagrammatically at 45R and 45L towards the screen 46. Vertical registry of the two beams to obtain accurate superimposition of the two images on the screen is readily obtained by relative adjustment of the two lenses 34 towards or away from each other by means of the control 35 as may be required to raise or lower the path of the center of each beam 31 and 32 through the projector, and if each pair of lenses 33–34 is mounted in a common mounting, the pairs of lenses can be similarly shifted towards and away from each other as units for the same purpose. In either case, this adjustment will ordinarily be made only during initial installation for a given projection distance and should not thereafter require changing.

In the operation of this system and apparatus, Fig. 1 illustrates the relative positions of the parts during the instant when frames carrying right and left eye images respectively are registered with the apertures 21 and 22 and the shutter 30 is open. The upper beam 31 will carry the right eye image to the screen while the lower beam 32 will carry the left eye image to the screen, with these beams being oppositely polarized by the polarizing devices 40. With the shutter 30 rotating at one and one-half revolutions per frame, these images will be flashed three times on the screen. Then during the third closed interval of the shutter, the film will advance so that the frame carrying the right eye image previously registered with apertures 21 will move to aperture 22 while at the same time a frame carrying a new left eye image will move into registry with aperture 21. Beam 31 will accordingly then carry the left eye image while beam 32 carries the right eye image, but the polarizers 40 are caused to rotate on their axis 41 at such a rate that the portion 40L of the upper polarizer will move into the path of beam 31 while the shutter is closed during the transport period of the film, while at the same time the portion 40R of the lower polarizer will move into the path of the beam 32, this result being readily obtained by driving the polarizers at one third the rate of rotation of the shutter. Thus each time the relationship of the two beams is changed with respect to the right and left eye images by the advance of the film, their directions of polarization will simultaneously be changed so that the relationship of each image and its direction of polarization remains at all times the same.

Fig. 2 shows essentially the same optical system as Fig. 1 incorporating a modified arrangement facilitating the adaptation of the system to another type of projector such particularly as a conventional commercial 35 millimeter projector of the type commonly used in motion picture theatres. The film 20 is of the same characteristics described in connection with Fig. 1 and is fed by means of the usual intermittent sprocket 50 and constant speed sprockets 51 and 52 past the apertures 21 and 22. The light source 24 is shown as a pair of arcs which may be used in cooperation with the spherical mirror 25 in place of a single arc if more light is desired than is available with a single arc. The shutter for this projector is shown as a pair of double bladed shutters 55 driven in opposite directions from a drive shaft 56.

In place of having the polarizers 40 arranged together as in Fig. 1, in the system and apparatus of Fig. 2, the polarizers are axially separated to provide space therebetween for incorporating a mounting and drive, and the two beams 31 and 32 are accordingly similarly displaced within the projector. This result is readily effective by means of a pair of 45° prisms 60 and 61 which first reflect the beams in opposite directions and then again reflect them forwardly through the lens systems 33—34 towards the polarizers 40. Also a beam displacer 62 or 63 is mounted for cooperation with each of the polarizers 40 to reflect the polarized beams out of the polarizers and then again forwardly towards the screen similarly to the beam displacer 44 in Fig. 1.

This arrangement as shown in Fig. 2 readily provides space between the two polarizers for receiving a selsyn slave motor 70 provided with a direct drive connection for both polarizers, and in order to synchronize this drive accurately with the shutters 55, the selsyn slave motor 70 is shown as electrically connected at 71 with a selsyn generator motor 72 provided with a geared drive 73 to a gear 74 in the shutter shaft 56. If the two-bladed shutters rotate at one revolution per frame, then with the gears 73 and 74 arranged in a one to two ratio, the selsyn motors and polarizers will be driven at the desired rate of one half the rate of revolution of the shutters in order to time the positions of the two parts of each polarizer with the shifting of the right and left eye images between the two light beams 31 and 32.

Provision should be made in this system for coordinating the polarizers with the film in the event that they should be 180° out of phase so that the left eye image will be polarized for the right eye and vice versa, as may happen at the beginning of a reel and which causes pseudoscopy. A simple arrangement for correction of this condition comprises a mounting for the selsyn generator motor 72 permitting rotation of the motor housing through 180°, as indicated at 76, which will cause corresponding rotation of the shaft of the slave motor 70 and thus establish the proper synchronized relation of the polarizers with the film. A drive shown diagrammatically at 77 is provided for manual operation to cause this rotational movement of the motor when required. This drive may include a geared arrangement as shown for the same purpose in my above noted patent, or it may include a simple electrical arrangement such as a solenoid and ratchet drive equipped with a control switch positioned for ready actuation by the operator. Then if at the beginning of the reel the operator notes that the film and polarizers are out of phase, the drive 77 will quickly and easily correct this condition. Alternatively, such correction may be effected by means of the conventional racking mechanism for correcting improper loading of the film in the projector.

Figure 4:
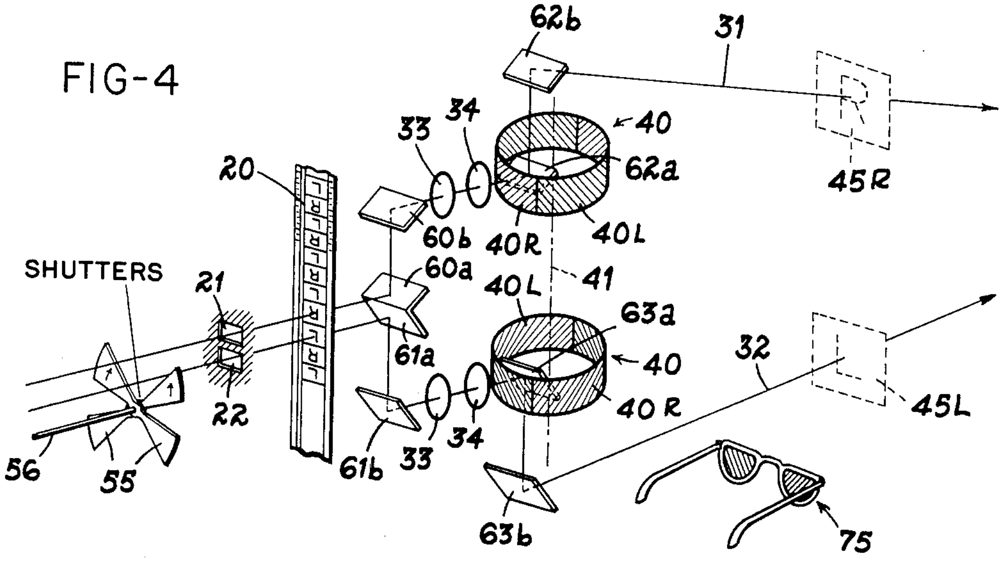
Fig. 4 is an exploded diagrammatic view in the nature of a perspective further illustrating the operation of the projection system of Fig. 2.

Fig. 4 illustrates diagrammatically the operation of the system and apparatus of Fig. 2. In Fig. 4, the reflecting surfaces of the prisms 60 and 61 are represented by mirrors 60*a*, 60*b*, 61*a* and 61*b* respectively, and the reflecting surfaces of the prisms 62 and 63 are similarly represented for convenience of illustration as mirrors 62*a*, 62*b*, 63*a* and 63*b* respectively. Fig. 4 also shows diagrammatically at 75 the polarizing spectacles worn by the viewers of the projected images 45R and 45L, and it will be noted that the lenses of these spectacles are shown as having their polarizing axes arranged in proper parallel relation with the directions of polarization of the two images, so that the right eye of the viewer sees only the right eye image 45R and vice versa.

Figure 5:
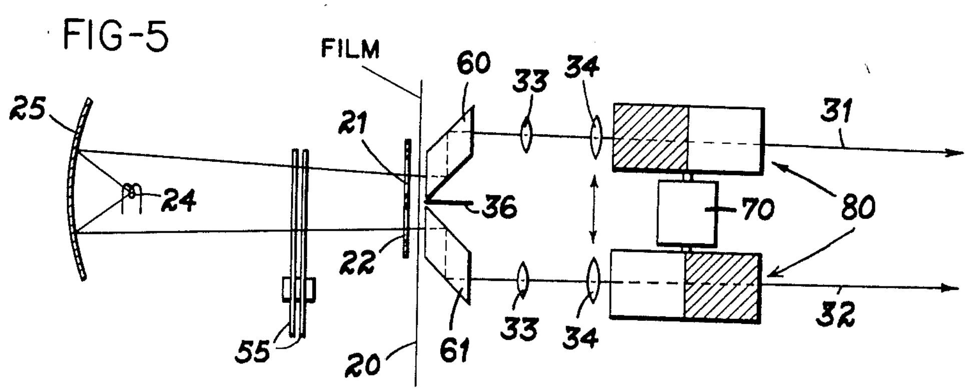
Figs. 5 to 7 are ray diagrams illustrating modifications of the optical systems of Figs. 1 and 2.

Fig. 5 illustrates a simplified optical system which is generally similar to that of Figs. 2 and 4 and in which therefore the parts corresponding to those in Figs. 2 and 4 bear similar reference characters. In Fig. 5, however, the polarizers 80 are of another type disclosed in my above noted patent in that each includes only a single semi-cylindrical strip of polarizing material while the remainder of its cylindrical outline is either open or clear. With this arrangement, the polarizers are oriented in the same directions, but they are 180° out of phase so that when the convex surface of one polarizer is presented to the beam 31, the concave side of the other polarizer will be presented to the beam 32 and vice versa. This arrangement results in polarizing the two beams in opposite directions and also in reversing their respective directions of polarization as the polarizers rotate in synchronization with the advance of the film. In this connection, it should be noted that it is not essential for the maintenance of proper polarization to reflect the beams out of the polarizers 40 in Figs. 1 and 2, since with the polarizers 40 formed as shown in Fig. 3, light polarized by passage through either the portion 40R or 40L will be transmitted by the other portion alhough at somewhat reduced intensity owing to the inherent light absorbing properties of polarizing materials.

Figure 6:
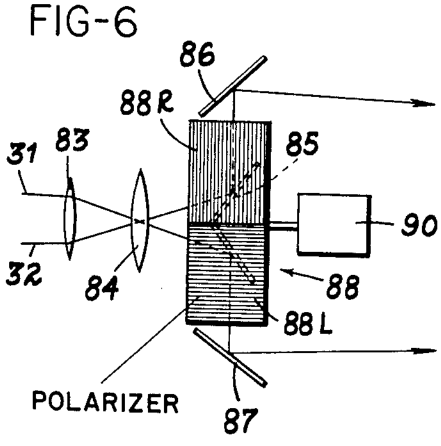

Fig. 6 shows still another optical system embodying many of the same elements as shown in Fig. 2 but with a simplified projection and polarizing system. In Fig. 6, the beams 31 and 32 traverse a single projection lens system comprising the lenses 83 and 84 in such manner that they are reflected to opposite sides of the horizontal center of the system, and these beams are first reflected in opposite directions by means of an angled mirror 85 and are then again reflected towards the screen by mirrors 86 and 87. A polarizing device 88 is mounted for rotation about the mirror 85 as shown so as to intercept the two reflected beams 31 and 32 between mirror 85 and mirrors 86 and 87, and this polarizer includes portions 88R and 88L having their axes arranged respectively circumferentially and axially of the polarizer so that the resulting right and left eye images will be polarized in horizontal and vertical planes respectively, this orientation of the polarizing axis of the parts being necessary in this arrangement because if the 45° polarization were used as in the other views, the desired oppositely polarized images would not be obtained. It will be noted that the arrangement of Fig. 6 is somewhat more compact than those of the other views and requires only a single polarizer, and also the selsyn motor 90 for driving the polarizer is readily mounted as shown along the main projector axis since the two polarized beams will travel above and below it to the screen.

Figure 7:
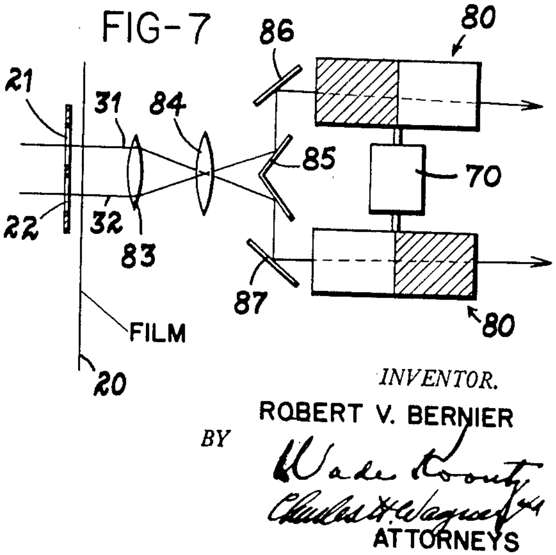
Figure 8:
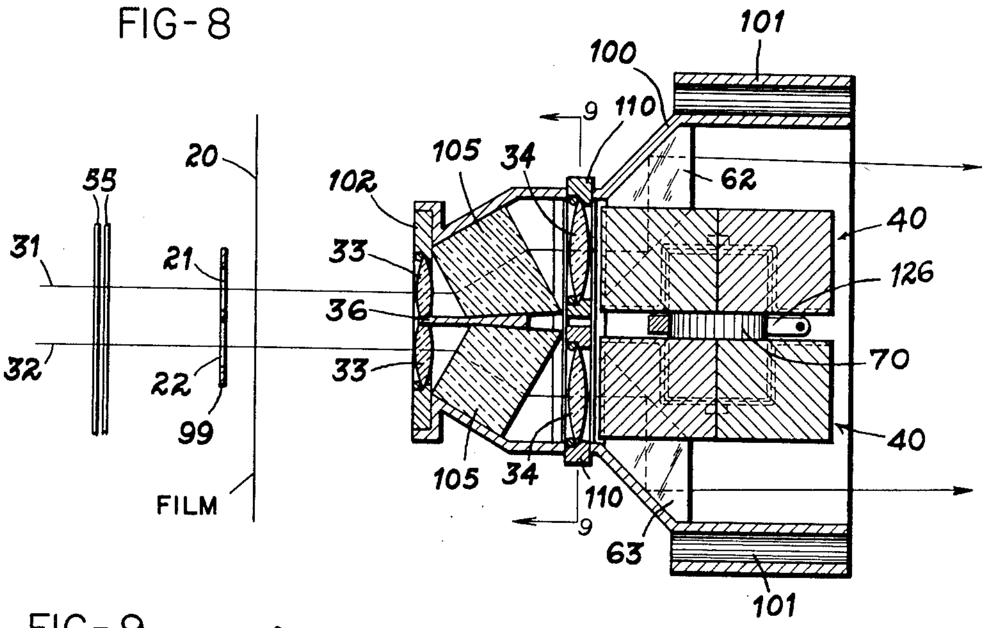
Fig. 8 is a somewhat diagrammatic view in vertical section taken approximately on the line 8—8 of Fig. 9 and illustrating a lens and polarizer system embodying the optical system of the invention and adapted for incorporation in an existing projector.

Fig. 7 shows an arrangement similar to that of Fig. 6 but incorporating a pair of polarizers 80 arranged in the same manner as described in connection with Fig. 2. With this arrangement, polarizers having their axes oriented at 45° may be used, and the mirrors operate as shown to reflect the two beams 31 and 32 first in opposite directions and then again forwardly through the polarizers and towards the screen. It will be apparent that polarizers of the type shown at 40 in the other views may also be used, either with or without additional prisms or mirrors as described in connection with Fig. 5.

It will accordingly be seen that these systems as illustrated in Figs. 1 to 7 effectively duplicate the optical conditions for each eye in three-dimensional projection which are now provided for both eyes in conventional two-dimensional projection apparatus. Whenever there is an image for one eye on the screen, there is an image for the other eye, and these images fluctuate with the intervals of darkness provided by the shutters at the same rate as in two-dimensional projection. Thus as in Fig. 4, if each of the two-bladed shutters rotates at one revolution per frame and the projector operates at 24 frames per second, the images and the intervals of darkness will fluctuate at the rate of 48 times per second, giving to each eye the same number of images as in conventional two-dimensional projection. Each eye will therefore see the same frame four times at these film and shutter speeds as compared with twice in the case of two-dimensional projection under comparable conditions, giving a total of twelve frames per second per eye as compared with 24 frames per second per eye in two-dimensional projection, but this difference is not significant for the reason that this rate of change of the frames is well within the persistence of vision of the eye, which as noted above, is approximately ten images per second, so that continuity of vision and movement will be amply maintained.

In addition to these features of freedom from flicker and proper continuity of vision and movement provided by the apparatus and system of the invention as illustrated in Figs. 1 to 7, it is also important to note that these advantages are obtained in accordance with the invention without affecting the accepted operating conditions and mechanisms of the conventional projectors in common present day use. Thus a three-dimensional motion picture may be produced and projected in accordance with the invention on standard film, under standard operating conditions, and with the film of the accepted proper length in terms of the running time and total number of reels. Essentially all that is required to adapt a standard projector for use in the practice of the invention is the substitution of a film gate member having two apertures instead of one and the substitution of a modified lens system and a housing for the lens system of the proper size and shape to support the several lenses, prisms, polarizers and drive for the polarizers. These substituted parts may readily be provided in such form as to be interchangeable with the corresponding parts for two-dimensional projection in conventional projectors.

Figs. 8 to 11 illustrate in more detail a structural arrangement embodying the optical system of the invention and adapted for ready incorporation in an existing projector. The film 20 carries stereoscopic images in alternate frames as previously described and travels past apertures 21 and 22 in the film gate insert 99, and the shutters 55 correspond to the similarly numbered parts in Figs. 2 and 4. A barrel 100 forms a common housing for the projection lenses 33 and 34, the polarizers 40, and their associated parts, and this housing is formed at 101 to receive guide rods or mounting bolts of the usual type for supporting the lens barrel or conventional projector within the main projector housing.

Figure 9:
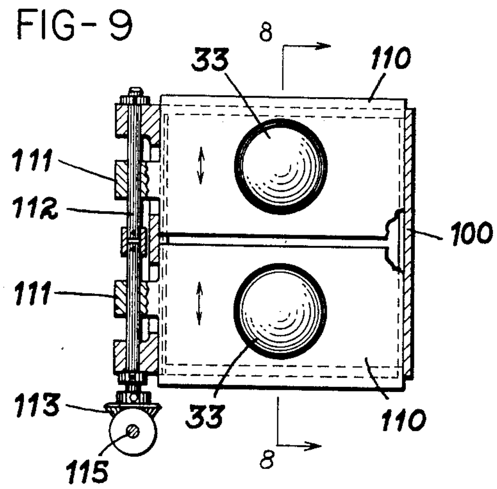
Fig. 9 is a sectional view approximately on the line 9—9 of Fig. 8 illustrating the adjustable mounting for the outer projection lens elements.

The inner lens elements 33 are carried in a common mounting 102 at the inner end of the housing 100, and these lenses have their adjacent edge portions cut away and separated by a septum 36 as previously described. Separation of the two beams 31 and 32 is effected by refraction within a pair of thick optical flats 105 tilted at an angle to give the desired displacement of the beams and mounted in the housing 100 between each lens 33 and its associated lens 34, and beam displacers 62 and 63 cooperate as described in connection with Fig. 2 with the polarizers 40 to reflect the polarized beams out of the polarizers and then forwardly towards the screen. Ready adjustment of the beams for accurate superimposition on the screen is effected by the sliding mountings 110 for the lens 34. As shown in Fig. 9, these lens frames are vertically slidable in housing 100 and include oppositely tapped extensions 111 for receiving the oppositely threaded portions of the adjusting screw 112, which may in turn be connected through gearing 113 with a control rod 115 corresponding to the similar member 35 in Fig. 1.

Figure 10:
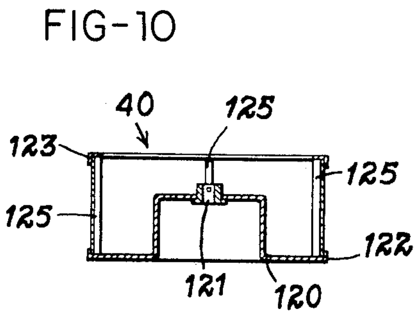
Fig. 10 is a fragmentary sectional view through one of the polarizing units of Fig. 8, the view being approximately on the line 10—10 of Fig. 11.
Figure 11:
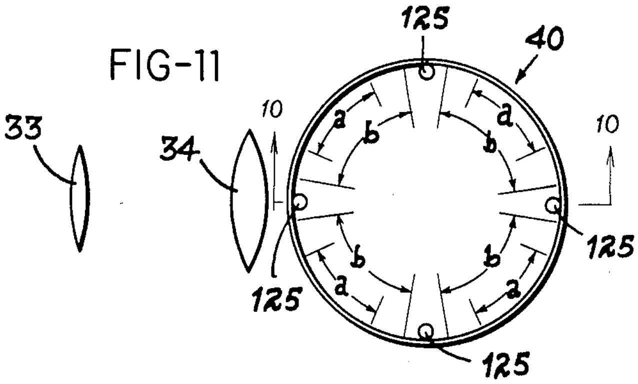
Fig. 11 is a somewhat diagrammatic view illustrating the operative relation of one of the polarizing units of Fig. 8 with its associated outer projection lens element.

Figs. 10 and 11 show structural details of the polarizers 40. On the inner side of each polarizing unit is a web 120 having a cylindrical or otherwise concave central portion for receiving one end of the selsyn slave motor 70 and including a hub portion 121 for attachment to the motor shaft. The outer edge of web 120 is flanged at 122 to retain the inner side edges of the polarizing strips 40R and 40L, and a retaining ring 123 for the opposite edges of the polarizing strips is secured to web 120 as by means of a plurality of pins or rivets 125. The two polarizers may be of identical construction for mounting on opposite ends of the drive shaft of the motor 70 and the motor may be readily mounted within housing 100 by means of a bracket 126 of suitable shape.

If the projector operates as described at a shutter speed which provides for both interrupting and projecting each frame twice, then the circumference of each polarizer 40 should be properly correlated with the diameter of the outer lens element 34 to assure properly uniform polarization of each projected image. Thus Fig. 11 represents the position of one of the polarizers 40 at the moment corresponding to the fully closed position of the shutters, and it will be seen that the polarizers should rotate at such rate that the shutters will open and close twice during each half-revolution of the polarizer. The portions marked *a* in Fig. 11 represent the areas of the polarizer which will be aligned with the lens 34 at the fully open positions of the shutters, but it will be seen that some light will be transmitted by the lens over approximately the entire larger areas marked *b* as the shutters move between fully opened and fully closed positions. In addition, the positions of the pins 125 should be so selected that they will be aligned with the lens only in the fully closed position of the shutters. In order to meet these several conditions, therefore, the circumference of each polarizer 40 should be at least eight times the diameter of the outer projection lens element.

As pointed out, the above systems and apparatus are readily incorporated in conventional projectors to give three-dimensional motion picture projection of alternate frame stereoscopic film without otherwise changing the standard operating conditions and feeding mechanism of the conventional projector. It should, however, be noted that the advantages of the invention may be obtained without requiring shifting of the polarizers as described if the film feeding mechanism is modified to effect advance of the film two frames at a time. If this change is made in the standard film feed, then the right and left eye images will always be projected through the same aperture 21 or 22 respectively, and it would then not be necessary to shift the polarizers. If under these conditions, difficulty should develop in keeping the polarizers adequately cooled, a difficulty which does not exist with the systems as disclosed in which the polarizers rotate continuously and are thus self-cooling, this difficulty could be overcome by forming each polarizer of a continuous strip of polarizing material having its axis uniformly oriented at 45° to its length and by continuously rotating this polarizer in combination with mirrors or prisms as shown in Figs. 1 and 2.

The above systems embodying the invention have been described as employing linear polarizers, but the invention is also applicable to the use of such systems employing circularly polarized light. For example, the polarizers 40 in Figs. 1 to 4 and 8 may be formed as circular polarizers by the incorporation with each of the linearly polarizing strips of a strip of quarter-wave retardation material having its principal vibration direction at 45° to the axis of the polarizing material. In the case of the polarizers 40, the quarter-wave material should be on the inside of the polarizing strips, so that the light will pass first through the polarizing material and then through retardation material, and similar results may be obtained with the polarizer 88 of Fig. 6 by adding a strip of quarter-wave retardation material on the outside of the polarizing device. Also, if circularly polarized light is used, the system may be modified to employ a single polarizing disk in place of the barrel-shaped polarizers described, and such an arrangement is shown in Fig. 12.

Figure 12:
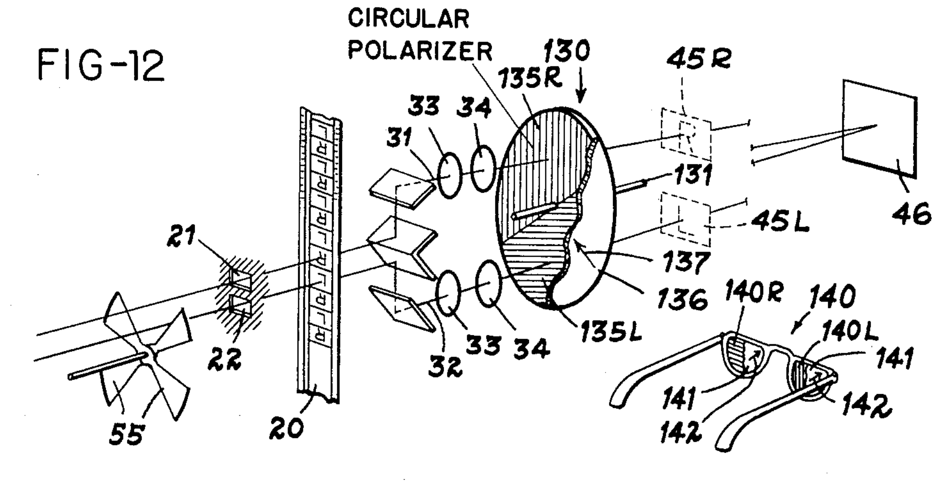
Fig. 12 is a view similar to Fig. 4 illustrating a form of the optical system of the invention incorporating circularly polarized light.

The system of Fig. 12 embodies in large measure the same essential parts as the systems of Figs. 1 to 4, and the parts are correspondingly numbered. The polarizing device 130, however, is shown as a disk mounted for rotation on a shaft 131 located between and parallel with the beams 31 and 32. This device includes two semicircular members 135R and 135L of linear polarizing material having their axes at right angles as shown by the cross-hatching, together with a circular member 136 of quarter-wave retardation material having its principal vibration direction at 45° to the axes of both polarizing members, as indicated by the arrow 137. The viewing spectacles 140 accordingly also include inner layers 140R and 140L of linear polarizing material and outer layers 141 of quarter-wave retardation material, the relative orientations of the polarizing axes and the principal vibration directions of these parts being represented by the cross-hatching and the arrows 142.

With this arrangement as shown in Fig. 12, the size and rate of rotation of the circular polarizer 130 are correlated with the general arrangement and operation of the projector in such manner that as the polarizer rotates, its portion 135R will intercept the beam 31 whenever this beam is carrying a right eye image but will move to intercept the beam 32 when that beam is carrying a right eye image, and vice versa. Thus with the shutters operating as described at one revolution per frame, the polarizer should rotate at one-half revolution per frame in coordinated relation with the film advancing mechanism such that the dividing line between the portions 140R and 140L will cross the paths of the beams 31 and 32 while the shutters are closed. This operating relationship may be readily computed in a manner similar to that described in connection with the polarizers 40 and the projection lens elements 34, and otherwise the operation of this system is essentially the same as already described in connection with Figs. 1 to 4.

Figure 13:
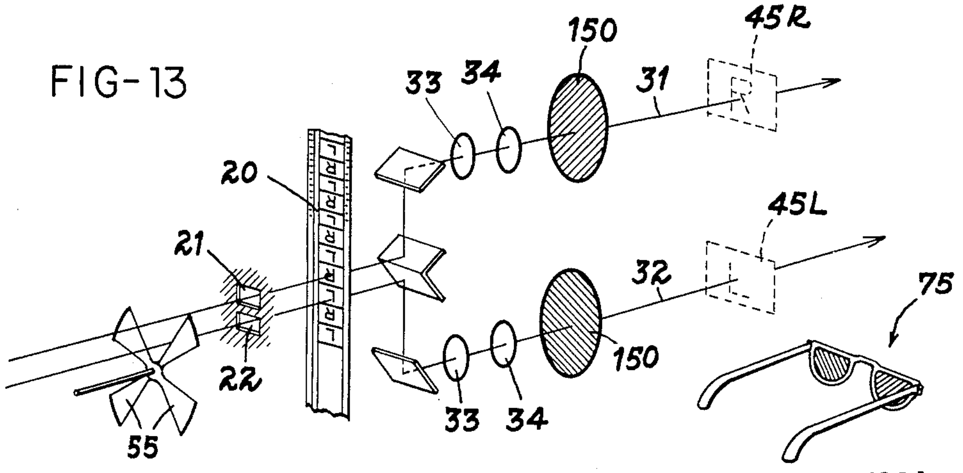
Fig. 13 is a view similar to Fig. 4 illustrating a form of the optical system of the invention incorporating a different arrangement of linear polarizers for the projected beams.

It is also possible in accordance with the invention to employ linear polarizing disks in the optical systems of the invention, providing these disks are driven intermittently in coordinated relation with the operation of the shutters and film advancing mechanism to shift the polarizing axes of the disks through 90° each time the film advances. Fig. 13 shows a system which is otherwise similar to those of the other views but incorporates separate polarizing disks 150 in the paths of the beams 31 and 32. In the arrangement shown in Fig. 13 with the beam 31 carrying the right eye image and the beam 32 carrying the left eye image, the polarizers 150 are similarly oriented in the paths of the two beams, and when the film advances to locate a frame carrying a right eye image in the aperture 22, the polarizers are rotated through 90° to maintain proper polarization as described.

Figures 14, 15, 16:
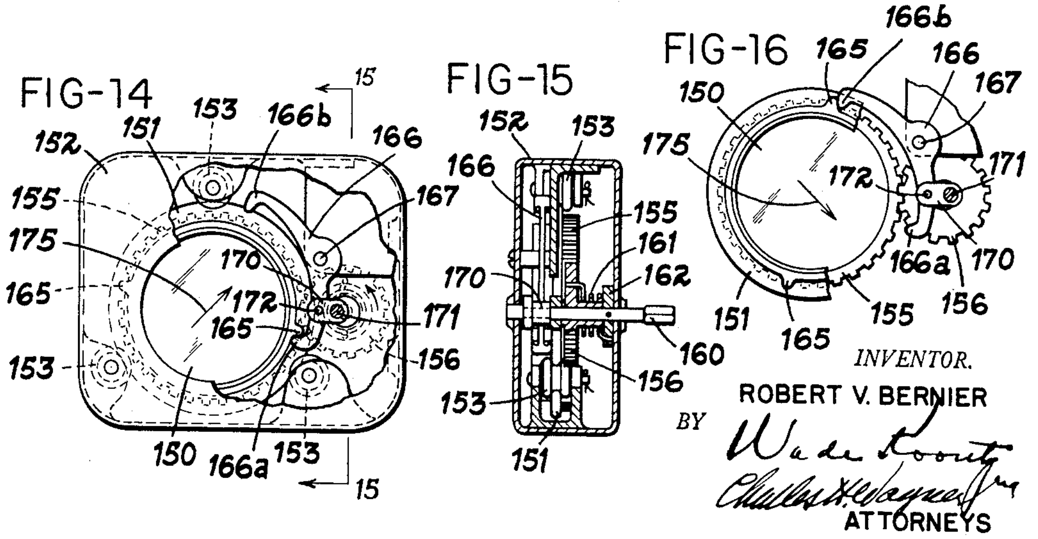
Fig. 14 is a detailed view in front elevation, with portions of the casing broken away, showing an intermittent drive mechanism for operating the polarizing elements of Fig. 13.
Fig. 15 is a section on the line 15—15 of Fig. 14.
Fig. 16 is a fragmentary view illustrating a moved position of certain of the parts in Fig. 14.

Figs. 14 to 16 illustrate a simple form of intermittent drive for operating the polarizers 150 to produce the desired result. The polarizing disk 150 is mounted in a rim 151 supported for rotation in a casing 152 by means of a plurality of rollers 153. The rim 151 carries sprocket teeth 155 meshing with a drive sprocket 156 which is free on the shaft 160 but is provided with a drive connection to the shaft through the torsion spring 161 having one end carried in sprocket 156 and the other end in a collar 162 fast on shaft 160. The rim 151 also carries a pair of escapement teeth 165 mounted at opposite ends of a diameter for cooperation with a double armed escapement lever 166 pivoted at 167 in the casing and operated by means of a link 170 pivoted on a crank portion 171 of shaft 160, the link 170 being pivoted to lever 166 by a pin 172.

It will thus be seen as the shaft 160 rotates from the position shown in Fig. 14, it will first act to wind up spring 161, and then as its crank connection to lever 166 rocks the lever to release the tooth 165 abutting pallet **166*a* on lever 166, the rim 151 will be free to rotate under the urging of spring 161 and sprocket 156 until the other tooth 165 abuts pallet 166*b* as shown in Fig. 16. These pallets are located 90° apart so that this movement of disk 150 shifts its polarizing axis 175 through 90° as shown to produce the required shift of the direction of polarization of the beam transmitted thereby. Continued rotation of shaft 160 will cause lever 166 to rock back to the position shown in Fig. 14 and thus to permit a further 90° of rotation of the polarizer 150, and this action will continue as long as shaft 160 is driven. The drive for this shaft is readily provided as described from the main projector drive, and if the drive ratio is one to four with respect to the drive for the shutters 55, the properly correlated relationship of the directions of polarization of the projected images will be maintained. It will also be noted that a similar intermittent drive may be provided with the circular polarizer 130** in Fig. 12 properly correlated with the advancing movement of the film.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. Apparatus for projecting three-dimensional motion pictures upon a common projection surface from film having unpolarized right and left eye stereoscopic images in alternate full frames thereof, comprising means defining a pair of film gate apertures past which said film is adapted to travel successively, said apertures being spaced in the direction of film travel to register simultaneously successive frames in said film, means for simultaneously projecting a beam of unpolarized light through each said aperture to project right and left eye images simultaneously from successive said frames, means for advancing said film frame by frame past said apertures, a cylindrical transparent polarizing filter mounted in the path of each of said beams from said apertures to said projection surface for rotation about an axis perpendicular to the direction of travel of the portion of said beam passing therethrough, each said filter including two semi-cylindrical portions of polarizing material having the polarizing axes thereof perpendicular to each other and at substantially 45° to said rotational axis of said filter, means for directing each said beam radially through the near side of the associated said filter to polarize said beam, means for directing said polarized beams generally axially of said filters to positions outside said filters and from said positions to said projection surface in superimposed relation, and means for continuously rotating said filters in coordinated relation with each other and with said drive means to reverse the respective directions of polarization of said beams each time said film is advanced to cause all said right eye images and all said left eye images to be polarized in respectively opposite directions.

2. Apparatus for projecting three-dimensional motion pictures upon a common projection surface from film having unpolarized right and left eye stereoscopic images in alternate full frames thereof, comprising means defining a pair of film gate apertures past which said film is adapted to travel successively, said apertures being spaced in the direction of film travel to register simultaneously successive frames in said film, means for simultaneously projecting a beam of unpolarized light through each said aperture to project right and left eye images simultaneously from successive said frames, a cylindrical transparent polarizing filter mounted in the path of each of said beams from said apertures to said projection surface for rotation about an axis perpendicular to the direction of travel of the portion of said beam passing therethrough, said filter including two semi-cylindrical portions of polarizing material having the polarizing axes thereof perpendicular to each other, means for directing each said beam radially through said polarizing filter in a predetermined path causing polarization of said beam in opposite directions in coordinated relation with the rotation of said polarizing member, drive means for advancing said film frame by frame to register each said frame first with one said aperture and then with the other, means for directing said polarized beams upon said common projection surface, and means operatively connected with said drive means for rotating said polarizing members through said respective positions thereof in synchronized relation with said advancing means to reverse the respective directions of polarization of said beams each time said film is advanced and thereby to cause all said right eye images and all said left eye images to be polarized in respectively opposite directions.

3. Apparatus for projecting three-dimensional motion pictures upon a common projection surface from film having unpolarized right and left eye stereoscopic images in alternate full frames thereof, comprising means defining a pair of film gate apertures past which said film is adapted to travel successively, said apertures being spaced in the direction of film travel to register simultaneously successive frames in said film, means for simultaneously projecting a beam of unpolarized light through each said aperture to project right and left eye images simultaneously from successive said frames, means for periodically interrupting said beams, means coordinated with said interrupting means for advancing said film frame by frame while said beams are interrupted to register each said frame first with one said aperture and then with the other, a cylindrical transparent polarizing filter mounted in the path of each of said beams from said apertures to said projection surface for rotation about an axis perpendicular to the direction of travel of the portion of said beam passing therethrough, each said filter including two semi-cylindrical portions of polarizing material having the polarizing axes thereof perpendicular to each other and at substantially 45° to said rotational axis of said filter, means for directing each said beam radially through the near side of the associated said filter to polarize said beam, means for directing said polarized beams generally axially of said filters to positions outside said filters and from said positions to said projection surface in superimposed relation, and means for continuously rotating said filters in coordinated relation with each other and in synchronized relation with said advancing means to reverse the respective directions of polarization of said beams each time said film is advanced and thereby to cause all said right eye images and all said left eye images to be polarized in respectively opposite directions.

4. Apparatus for projecting three-dimensional motion pictures upon a common projection surface from film having unpolarized right and left eye stereoscopic images in alternate full frames thereof and in conjunction with a projector having a light source and including means defining a pair of film gate apertures and a drive for advancing said film frame by frame past said apertures, comprising a housing adapted to be secured to said projector in the path of light beams from said light source through said aperatures, projecting lens means in said housing for said light beams, means in said housing for laterally displacing said light beams, a cylindrical transparent polarizing filter mounted in said housing in the path of each of said beams for rotation about an axis perpendicular to the direction of travel of the portion of said beam passing therethrough, each said filter including two semi-cylindrical portions of sheet polarizing material having the polarizing axes thereof perpendicular to each other and at substantially 45° to said rotational axis of said filter, means in said housing for directing each said beam radially through the associated said filter to polarize said beam, means in said housing for directing said polarized beams to said projection surface in superimposed relation, and means coordinated with said drive for continuously rotating said filters in synchronized relation with said drive to reverse the respective directions of polarization of said beams each time said film is advanced and thereby to cause all said right eye images and all said left eye images to be polarized in respectively opposite directions.

5. Apparatus for incorporation with a motion picture projector having a light source and a drive for advancing motion picture film frame by frame to adapt such projector for projection of three-dimensional motion pictures from film having unpolarized right and left eye stereoscopic images in alternate full frames thereof, comprising means defining a pair of film gate apertures adapted to be positioned in said projector in the path of light from said light source for registry with successive said full frames of said film, a housing adapted to be secured to said projector in the path of light beams from said light source through said apertures, projecting lens means in said housing for said beams, a cylindrical transparent polarizing filter mounted in said housing in the path of each of said beams for rotation about an axis perpendicular to the direction of travel of the portion of said beam passing therethrough, each said filter including two semi-cylindrical portions of sheet polarizing material having the polarizing axes thereof perpendicular to each other and at substantially 45° to said rotational axis of said filter, means in said housing for directing each said beam radially through the associated said filter to polarize said beam, means in said housing for directing said polarized beams to a common projection surface in superimposed relation, and means for connecting said filters with said projector drive to rotate said filters in coordinated relation with said drive causing reversal of the respective directions of polarization of said beams each time said film is advanced and thereby causing all said right eye images and all said left eye images to be polarized in respectively opposite directions.

References Cited in the file of this patent

UNITED STATES PATENTS

| | | |
|---|---|---|
| 1,879,793 | Chubb | Sept. 27, 1932 |
| 2,145,437 | Thomas | Jan. 31, 1939 |
| 2,152,959 | Gilmore | Apr. 4, 1939 |
| 2,251,177 | Thomas | July 29, 1941 |
| 2,268,338 | Kober et al. | Dec. 30, 1941 |
| 2,270,198 | Schensted | Jan. 13, 1942 |
| 2,415,550 | Yarosh | Feb. 11, 1947 |

FOREIGN PATENTS

| | | |
|---|---|---|
| 224,393 | Great Britain | Nov. 13, 1924 |
| 366,287 | Italy | Dec. 23, 1938 |
| 555,670 | Great Britain | Sept. 2, 1943 |
| 582,773 | Great Britain | Nov. 27, 1946 |
| 650,277 | Great Britain | Feb. 21, 1951 |